United States Patent
Lopez et al.

(10) Patent No.: US 8,991,506 B2
(45) Date of Patent: Mar. 31, 2015

(54) AUTONOMOUS FLUID CONTROL DEVICE HAVING A MOVABLE VALVE PLATE FOR DOWNHOLE FLUID SELECTION

(75) Inventors: Jean-Marc Lopez, Plano, TX (US); Liang Zhao, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/640,542

(22) PCT Filed: Oct. 31, 2011

(86) PCT No.: PCT/US2011/058606
§ 371 (c)(1),
(2), (4) Date: Oct. 11, 2012

(87) PCT Pub. No.: WO2013/066295
PCT Pub. Date: May 10, 2013

(65) Prior Publication Data
US 2014/0231095 A1    Aug. 21, 2014

(51) Int. Cl.
*E21B 34/08* (2006.01)
*E21B 43/12* (2006.01)
*F16K 15/03* (2006.01)
*E21B 34/00* (2006.01)

(52) U.S. Cl.
CPC .............. *E21B 34/08* (2013.01); *E21B 43/12* (2013.01); *F16K 15/03* (2013.01); *E21B 2034/005* (2013.01)
USPC .......................................... 166/373; 166/320

(58) Field of Classification Search
USPC .................. 166/369, 373, 386, 320
See application file for complete search history.

(56) References Cited

U.S. PATENT DOCUMENTS

| | | | |
|---|---|---|---|
| 553,727 | A | 1/1896 | Van Sickle |
| 1,329,559 | A | 2/1920 | Tesla |

(Continued)

FOREIGN PATENT DOCUMENTS

| | | |
|---|---|---|
| EP | 0834342 B1 | 1/1999 |
| EP | 1672167 A1 | 6/2006 |

(Continued)

OTHER PUBLICATIONS

Tesar, "Fluidic Valves for Variable-Configuration Gas Treatment, Chemical Engineering Research and Design", 83 (A9), pp. 1111-1121, Jun. 27, 2005.

(Continued)

*Primary Examiner* — William P Neuder

(57) ABSTRACT

An apparatus and method are described for autonomously controlling flow of fluid in a subterranean well, where fluid flow is controlled based on a fluid characteristic, such as viscosity or density, which changes over time. Fluid flows into a vortex assembly where a centrifugal force is imparted to the fluid. A less viscous fluid will have a relatively greater velocity and centrifugal force than a more viscous fluid. The fluid exits the vortex chamber by both a vortex outlet and a peripheral outlet. An autonomous valve element moves between an open position, in which fluid flows freely through the peripheral outlet, and a closed position, in which fluid flow through the peripheral outlet is restricted. The valve element is moved by the centrifugal force of the fluid, such that a fluid having a higher centrifugal force moves the valve element to the closed position, thereby reducing the total fluid flow through the vortex assembly.

20 Claims, 4 Drawing Sheets

(56) References Cited

U.S. PATENT DOCUMENTS

| | | |
|---|---|---|
| 2,140,735 A | 12/1938 | Clarke |
| 2,324,819 A | 6/1941 | Butzbach |
| 2,762,437 A | 9/1956 | Egan |
| 2,849,070 A | 8/1958 | Maly |
| 2,945,541 A | 7/1960 | Maly |
| 2,981,332 A | 4/1961 | Miller |
| 2,981,333 A | 4/1961 | Miller |
| 3,091,393 A | 5/1963 | Sparrow |
| 3,186,484 A | 6/1965 | Waterman |
| 3,216,439 A | 11/1965 | Manion |
| 3,233,621 A | 2/1966 | Manion |
| 3,233,622 A | 2/1966 | Boothe |
| 3,256,899 A | 6/1966 | Dexter |
| 3,266,510 A | 8/1966 | Wadey |
| 3,267,946 A | 8/1966 | Adams |
| 3,282,279 A | 11/1966 | Manion |
| 3,375,842 A | 4/1968 | Reader |
| 3,427,580 A | 2/1969 | Brock |
| 3,461,897 A | 8/1969 | Kwok |
| 3,470,894 A | 10/1969 | Rimmer |
| 3,474,670 A | 10/1969 | Rupert |
| 3,477,506 A | 11/1969 | Malone |
| 3,486,975 A | 12/1969 | Ripley |
| 3,489,009 A | 1/1970 | Rimmer |
| 3,515,160 A | 6/1970 | Cohen |
| 3,521,657 A | 7/1970 | Ayers |
| 3,529,614 A | 9/1970 | Nelson |
| 3,537,466 A | 11/1970 | Chapin |
| 3,554,209 A | 1/1971 | Brown |
| 3,566,900 A | 3/1971 | Black |
| 3,575,804 A | 4/1971 | Ripley |
| 3,586,104 A | 6/1971 | Hyde |
| 3,598,137 A | 8/1971 | Glaze |
| 3,620,238 A | 11/1971 | Kawahata |
| 3,638,672 A | 2/1972 | Smith |
| 3,643,676 A | 2/1972 | Limage |
| 3,670,753 A | 6/1972 | Healey |
| 3,704,832 A | 12/1972 | Fix |
| 3,712,321 A | 1/1973 | Bauer |
| 3,717,164 A | 2/1973 | Griffin |
| 3,730,673 A | 5/1973 | Straitz |
| 3,745,115 A | 7/1973 | Olsen |
| 3,754,576 A | 8/1973 | Zetterstrom |
| 3,756,285 A | 9/1973 | Johnson |
| 3,776,460 A | 12/1973 | Fichter |
| 3,850,190 A | 11/1974 | Carlson |
| 3,860,519 A | 1/1975 | Weatherford |
| 3,876,016 A | 4/1975 | Stinson |
| 3,885,627 A | 5/1975 | Berry et al. |
| 3,895,901 A | 7/1975 | Swartz |
| 3,927,849 A | 12/1975 | Kovalenko |
| 3,942,557 A | 3/1976 | Tsuchiya |
| 4,003,405 A | 1/1977 | Hayes |
| 4,029,127 A | 6/1977 | Thompson |
| 4,082,169 A | 4/1978 | Bowles |
| 4,127,173 A | 11/1978 | Watkins |
| 4,134,100 A | 1/1979 | Funke |
| 4,138,669 A | 2/1979 | Edison |
| 4,167,073 A | 9/1979 | Tang |
| 4,167,873 A | 9/1979 | Bahrton |
| 4,187,909 A | 2/1980 | Erbstoesser |
| 4,268,245 A | 5/1981 | Straitz, III |
| 4,276,943 A | 7/1981 | Holmes |
| 4,279,304 A | 7/1981 | Harper |
| 4,282,097 A | 8/1981 | Kuepper |
| 4,286,627 A | 9/1981 | Graf |
| 4,287,952 A | 9/1981 | Erbstoesser |
| 4,291,395 A | 9/1981 | Holmes |
| 4,303,128 A | 12/1981 | Marr, Jr. |
| 4,307,204 A | 12/1981 | Vidal |
| 4,307,653 A | 12/1981 | Goes |
| 4,323,118 A | 4/1982 | Bergmann |
| 4,323,991 A | 4/1982 | Holmes |
| 4,345,650 A | 8/1982 | Wesley |
| 4,364,232 A | 12/1982 | Sheinbaum |
| 4,364,587 A | 12/1982 | Samford |
| 4,385,875 A | 5/1983 | Kanazawa |
| 4,390,062 A | 6/1983 | Fox |
| 4,393,928 A | 7/1983 | Warnock, Sr. |
| 4,396,062 A | 8/1983 | Iskander |
| 4,413,935 A * | 11/1983 | Smith et al. .................. 406/181 |
| 4,418,721 A | 12/1983 | Holmes |
| 4,442,903 A | 4/1984 | Schutt |
| 4,467,833 A | 8/1984 | Satterwhite |
| 4,485,780 A | 12/1984 | Price |
| 4,491,186 A | 1/1985 | Alder |
| 4,495,990 A | 1/1985 | Titus |
| 4,518,013 A | 5/1985 | Lazarus |
| 4,526,667 A | 7/1985 | Parkhurst |
| 4,527,636 A | 7/1985 | Bordon |
| 4,557,295 A | 12/1985 | Holmes |
| 4,562,867 A | 1/1986 | Stouffer |
| 4,570,675 A | 2/1986 | Fenwick |
| 4,570,715 A | 2/1986 | Van Meurs |
| 4,618,197 A | 10/1986 | White |
| 4,648,455 A | 3/1987 | Luke |
| 4,716,960 A | 1/1988 | Eastlund |
| 4,747,451 A | 5/1988 | Adams |
| 4,765,184 A | 8/1988 | Delatore |
| 4,801,310 A | 1/1989 | Bielefeldt |
| 4,805,407 A | 2/1989 | Buchanan |
| 4,808,084 A | 2/1989 | Tsubouchi |
| 4,817,863 A | 4/1989 | Bragg |
| 4,846,224 A | 7/1989 | Collins, Jr. |
| 4,848,991 A | 7/1989 | Bielefeldt |
| 4,895,582 A | 1/1990 | Bielefeldt |
| 4,911,239 A | 3/1990 | Winckler |
| 4,919,201 A | 4/1990 | Bridges |
| 4,919,204 A | 4/1990 | Baker |
| 4,921,438 A | 5/1990 | Godfrey |
| 4,945,995 A | 8/1990 | Tholance |
| 4,967,048 A | 10/1990 | Langston |
| 4,974,674 A | 12/1990 | Wells |
| 4,984,594 A | 1/1991 | Vinegar |
| 4,998,585 A | 3/1991 | Newcomer |
| RE33,690 E | 9/1991 | Adams, Jr. |
| 5,058,683 A | 10/1991 | Godfrey |
| 5,076,327 A | 12/1991 | Mettner |
| 5,080,783 A | 1/1992 | Brown |
| 5,099,918 A | 3/1992 | Bridges |
| 5,154,835 A | 10/1992 | Demichael |
| 5,165,450 A | 11/1992 | Marrelli |
| 5,166,677 A | 11/1992 | Schoenberg |
| 5,184,678 A | 2/1993 | Pechkov |
| 5,202,194 A | 4/1993 | Vanberg |
| 5,207,273 A | 5/1993 | Cates |
| 5,207,274 A | 5/1993 | Streich |
| 5,228,508 A | 7/1993 | Facteau |
| 5,251,703 A | 10/1993 | Skinner |
| 5,279,363 A | 1/1994 | Schultz |
| 5,282,508 A | 2/1994 | Ellingsen |
| 5,303,782 A | 4/1994 | Johannessen |
| 5,332,035 A | 7/1994 | Schultz |
| 5,333,684 A | 8/1994 | Walter |
| 5,337,808 A | 8/1994 | Graham |
| 5,337,821 A | 8/1994 | Peterson |
| 5,338,496 A | 8/1994 | Talbot |
| 5,341,883 A | 8/1994 | Ringgenberg |
| 5,343,963 A | 9/1994 | Bouldin |
| 5,365,962 A | 11/1994 | Taylor |
| 5,375,658 A | 12/1994 | Schultz |
| 5,435,393 A | 7/1995 | Brekke |
| 5,455,804 A | 10/1995 | Holmes |
| 5,464,059 A | 11/1995 | Kristiansen |
| 5,482,117 A | 1/1996 | Kolpak |
| 5,484,016 A | 1/1996 | Surjaatmadja |
| 5,505,262 A | 4/1996 | Cobb |
| 5,516,603 A | 5/1996 | Holcombe |
| 5,533,571 A | 7/1996 | Surjaatmadja |
| 5,547,029 A | 8/1996 | Rubbo |
| 5,570,744 A | 11/1996 | Weingarten |
| 5,578,209 A | 11/1996 | Weiss |
| 5,578,753 A | 11/1996 | Weiss et al. |
| 5,673,751 A | 10/1997 | Head |

(56) References Cited

U.S. PATENT DOCUMENTS

| | | |
|---|---|---|
| 5,707,214 A | 1/1998 | Schmidt |
| 5,730,223 A | 3/1998 | Restarick |
| 5,803,179 A | 9/1998 | Echols |
| 5,815,370 A | 9/1998 | Sutton |
| 5,839,508 A | 11/1998 | Tubel |
| 5,868,201 A | 2/1999 | Bussear |
| 5,893,383 A | 4/1999 | Facteau |
| 5,896,076 A | 4/1999 | Van Namen |
| 5,896,928 A | 4/1999 | Coon |
| 6,009,951 A | 1/2000 | Coronado |
| 6,015,011 A | 1/2000 | Hunter |
| 6,032,733 A | 3/2000 | Ludwig |
| 6,078,471 A | 6/2000 | Fiske |
| 6,098,020 A | 8/2000 | DenBoer |
| 6,109,370 A | 8/2000 | Gray |
| 6,109,372 A | 8/2000 | Dorel et al. |
| 6,112,817 A | 9/2000 | Voll |
| 6,164,375 A | 12/2000 | Carisella |
| 6,176,308 B1 | 1/2001 | Pearson |
| 6,179,052 B1 | 1/2001 | Purkis |
| 6,199,399 B1 | 3/2001 | Voorhis |
| 6,241,019 B1 | 6/2001 | Davidson |
| 6,247,536 B1 | 6/2001 | Leismer |
| 6,253,847 B1 | 7/2001 | Stephenson |
| 6,253,861 B1 | 7/2001 | Carmichael |
| 6,305,470 B1 | 10/2001 | Woie |
| 6,315,043 B1 | 11/2001 | Farrant |
| 6,315,049 B1 | 11/2001 | Hickey |
| 6,320,238 B1 | 11/2001 | Kizilyalli |
| 6,336,502 B1 | 1/2002 | Surjaatmadja |
| 6,345,963 B1 | 2/2002 | Thomin |
| 6,367,547 B1 | 4/2002 | Towers |
| 6,371,210 B1 | 4/2002 | Bode |
| 6,374,858 B1 | 4/2002 | Hides |
| 6,397,950 B1 | 6/2002 | Streich |
| 6,405,797 B2 | 6/2002 | Davidson |
| 6,426,917 B1 | 7/2002 | Tabanou |
| 6,431,282 B1 | 8/2002 | Bosma |
| 6,433,991 B1 | 8/2002 | Deaton |
| 6,450,263 B1 | 9/2002 | Schwendemann |
| 6,464,011 B2 | 10/2002 | Tubel |
| 6,470,970 B1 | 10/2002 | Purkis |
| 6,497,252 B1 | 12/2002 | Kohler |
| 6,505,682 B2 | 1/2003 | Brockman |
| 6,516,888 B1 | 2/2003 | Gunnarson |
| 6,540,263 B1 | 4/2003 | Sausner |
| 6,544,691 B1 | 4/2003 | Guidotti |
| 6,547,010 B2 | 4/2003 | Hensley |
| 6,567,013 B1 | 5/2003 | Purkis |
| 6,575,237 B2 | 6/2003 | Purkis |
| 6,575,248 B2 | 6/2003 | Zhang |
| 6,585,051 B2 | 7/2003 | Purkis |
| 6,619,394 B2 | 9/2003 | Soliman |
| 6,622,794 B2 | 9/2003 | Zisk, Jr. |
| 6,627,081 B1 | 9/2003 | Hilditch |
| 6,644,412 B2 | 11/2003 | Bode |
| 6,668,936 B2 | 12/2003 | Williamson, Jr. |
| 6,672,382 B2 | 1/2004 | Schultz |
| 6,679,324 B2 | 1/2004 | Den Boer |
| 6,679,332 B2 | 1/2004 | Vinegar |
| 6,691,781 B2 | 2/2004 | Grant et al. |
| 6,695,067 B2 | 2/2004 | Johnson |
| 6,705,085 B1 | 3/2004 | Braithwaite |
| 6,708,763 B2 | 3/2004 | Howard |
| 6,719,048 B1 | 4/2004 | Ramos |
| 6,719,051 B2 | 4/2004 | Hailey, Jr. |
| 6,725,925 B2 | 4/2004 | Al-Ramadhan |
| 6,769,498 B2 | 8/2004 | Hughes |
| 6,786,285 B2 | 9/2004 | Johnson et al. |
| 6,812,811 B2 | 11/2004 | Robison |
| 6,817,416 B2 | 11/2004 | Wilson |
| 6,834,725 B2 | 12/2004 | Whanger et al. |
| 6,840,325 B2 | 1/2005 | Stephenson |
| 6,851,473 B2 | 2/2005 | Davidson |
| 6,851,560 B2 | 2/2005 | Reig |
| 6,857,475 B2 | 2/2005 | Johnson |
| 6,857,476 B2 | 2/2005 | Richards |
| 6,886,634 B2 | 5/2005 | Richards |
| 6,907,937 B2 | 6/2005 | Whanger |
| 6,913,079 B2 | 7/2005 | Tubel |
| 6,935,432 B2 | 8/2005 | Nguyen |
| 6,957,703 B2 | 10/2005 | Trott |
| 6,958,704 B2 | 10/2005 | Vinegar |
| 6,967,589 B1 | 11/2005 | Peters |
| 6,976,507 B1 | 12/2005 | Webb |
| 7,007,756 B2 | 3/2006 | Lerche |
| 7,011,101 B2 | 3/2006 | Bowe |
| 7,011,152 B2 | 3/2006 | Soelvik |
| 7,013,979 B2 | 3/2006 | Richard |
| 7,017,662 B2 | 3/2006 | Schultz |
| 7,025,134 B2 | 4/2006 | Byrd |
| 7,038,332 B2 | 5/2006 | Robison et al. |
| 7,040,391 B2 | 5/2006 | Leuthen |
| 7,043,937 B2 | 5/2006 | Lifson |
| 7,059,401 B2 | 6/2006 | Bode |
| 7,063,162 B2 | 6/2006 | Oaling |
| 7,066,261 B2 | 6/2006 | Vicente |
| 7,096,945 B2 | 8/2006 | Richards |
| 7,100,686 B2 | 9/2006 | Wittrisch |
| 7,108,083 B2 | 9/2006 | Simonds |
| 7,114,560 B2 | 10/2006 | Nguyen |
| 7,143,832 B2 | 12/2006 | Freyer |
| 7,168,494 B2 | 1/2007 | Starr |
| 7,185,706 B2 | 3/2007 | Freyer |
| 7,199,480 B2 | 4/2007 | Fripp |
| 7,207,386 B2 | 4/2007 | Brannon |
| 7,213,650 B2 | 5/2007 | Lehman |
| 7,213,681 B2 | 5/2007 | Birchak |
| 7,216,738 B2 | 5/2007 | Birchak |
| 7,258,169 B2 | 8/2007 | Fripp |
| 7,290,606 B2 | 11/2007 | Coronado |
| 7,318,471 B2 | 1/2008 | Rodney |
| 7,322,409 B2 | 1/2008 | Wittle |
| 7,322,416 B2 | 1/2008 | Burris |
| 7,350,577 B2 | 4/2008 | Howard |
| 7,363,967 B2 | 4/2008 | Burris |
| 7,404,416 B2 | 7/2008 | Schultz |
| 7,405,998 B2 | 7/2008 | Webb |
| 7,409,999 B2 | 8/2008 | Henriksen |
| 7,413,010 B2 | 8/2008 | Blauch |
| 7,419,002 B2 | 9/2008 | Oybevik |
| 7,426,962 B2 | 9/2008 | Moen |
| 7,440,283 B1 | 10/2008 | Rafie |
| 7,455,104 B2 | 11/2008 | Duhon |
| 7,464,609 B2 | 12/2008 | Fallet |
| 7,468,890 B2 | 12/2008 | Lin |
| 7,469,743 B2 | 12/2008 | Richards |
| 7,520,321 B2 | 4/2009 | Hiron |
| 7,537,056 B2 | 5/2009 | Macdougal |
| 7,578,343 B2 | 8/2009 | Augustine |
| 7,621,336 B2 | 11/2009 | Badalamenti |
| 7,644,773 B2 | 1/2010 | Richard |
| 7,686,078 B2 | 3/2010 | Khomynets |
| 7,699,102 B2 | 4/2010 | Storm |
| 7,708,068 B2 | 5/2010 | Hailey, Jr. |
| 7,780,152 B2 | 8/2010 | Rao |
| 7,814,973 B2 | 10/2010 | Dusterhoft |
| 7,828,067 B2 | 11/2010 | Scott |
| 7,857,050 B2 | 12/2010 | Zazovsky |
| 7,882,894 B2 | 2/2011 | Nguyen |
| 7,918,272 B2 | 4/2011 | Gaudette |
| 8,016,030 B1 | 9/2011 | Prado Garcia |
| 8,025,103 B1 | 9/2011 | Wolinsky |
| 8,083,935 B2 | 12/2011 | Eia |
| 8,127,856 B1 | 3/2012 | Nish |
| 8,191,627 B2 | 6/2012 | Hamid |
| 8,196,665 B2 | 6/2012 | Wolinsky |
| 8,235,128 B2 | 8/2012 | Dykstra |
| 8,261,839 B2 | 9/2012 | Fripp |
| 8,272,443 B2 | 9/2012 | Watson |
| 8,276,669 B2 | 10/2012 | Dykstra |
| 8,302,696 B2 | 11/2012 | Williams et al. |
| 2002/0148607 A1 | 10/2002 | Pabst |
| 2002/0150483 A1 | 10/2002 | Ursan |

(56) References Cited

U.S. PATENT DOCUMENTS

| | | |
|---|---|---|
| 2003/0173086 A1 | 9/2003 | Howard |
| 2004/0011561 A1 | 1/2004 | Hughes |
| 2005/0110217 A1 | 5/2005 | Wood |
| 2005/0150657 A1 | 7/2005 | Howard |
| 2005/0173351 A1 | 8/2005 | Neofotistos |
| 2005/0214147 A1 | 9/2005 | Schultz |
| 2006/0076150 A1 | 4/2006 | Coronado |
| 2006/0113089 A1 | 6/2006 | Henriksen |
| 2006/0131033 A1 | 6/2006 | Bode |
| 2006/0185849 A1 | 8/2006 | Edwards |
| 2007/0012454 A1 | 1/2007 | Ross |
| 2007/0028977 A1 | 2/2007 | Goulet |
| 2007/0045038 A1 | 3/2007 | Han |
| 2007/0107719 A1 | 5/2007 | Blacker |
| 2007/0169942 A1 | 7/2007 | Loretz |
| 2007/0173397 A1 | 7/2007 | Hinman |
| 2007/0193752 A1 | 8/2007 | Kim |
| 2007/0246225 A1 | 10/2007 | Hailey |
| 2007/0246407 A1 | 10/2007 | Richards |
| 2007/0256828 A1 | 11/2007 | Birchak |
| 2008/0035330 A1 | 2/2008 | Richards |
| 2008/0041580 A1 | 2/2008 | Freyer |
| 2008/0041581 A1 | 2/2008 | Richards |
| 2008/0041582 A1 | 2/2008 | Saetre |
| 2008/0041588 A1 | 2/2008 | Richards |
| 2008/0149323 A1 | 6/2008 | O'Malley |
| 2008/0169099 A1 | 7/2008 | Pensgaard |
| 2008/0236839 A1 | 10/2008 | Oddie |
| 2008/0251255 A1 | 10/2008 | Forbes |
| 2008/0261295 A1 | 10/2008 | Butler |
| 2008/0283238 A1 | 11/2008 | Richards |
| 2008/0314578 A1 | 12/2008 | Jackson |
| 2008/0314590 A1 | 12/2008 | Patel |
| 2009/0000787 A1 | 1/2009 | Hill |
| 2009/0008088 A1 | 1/2009 | Schultz |
| 2009/0008090 A1 | 1/2009 | Schultz |
| 2009/0009297 A1 | 1/2009 | Shinohara |
| 2009/0009333 A1 | 1/2009 | Bhogal |
| 2009/0009336 A1 | 1/2009 | Ishikawa |
| 2009/0009412 A1 | 1/2009 | Warther |
| 2009/0009437 A1 | 1/2009 | Hwang |
| 2009/0009445 A1 | 1/2009 | Lee |
| 2009/0009447 A1 | 1/2009 | Naka |
| 2009/0020292 A1 | 1/2009 | Loretz |
| 2009/0065197 A1 | 3/2009 | Eslinger |
| 2009/0078427 A1 | 3/2009 | Patel |
| 2009/0078428 A1 | 3/2009 | Ali |
| 2009/0101342 A1 | 4/2009 | Gaudette |
| 2009/0101344 A1 | 4/2009 | Crow |
| 2009/0101352 A1 | 4/2009 | Coronado |
| 2009/0101354 A1 | 4/2009 | Holmes |
| 2009/0114395 A1 | 5/2009 | Holmes |
| 2009/0120647 A1 | 5/2009 | Turick |
| 2009/0133869 A1 | 5/2009 | Clem |
| 2009/0145609 A1 | 6/2009 | Holmes et al. |
| 2009/0151925 A1 | 6/2009 | Richards |
| 2009/0159282 A1 | 6/2009 | Webb |
| 2009/0188661 A1 | 7/2009 | Bizon |
| 2009/0205834 A1 | 8/2009 | Garcia et al. |
| 2009/0226301 A1 | 9/2009 | Priestman et al. |
| 2009/0236102 A1 | 9/2009 | Guest et al. |
| 2009/0250224 A1 | 10/2009 | Wright et al. |
| 2009/0277639 A1 | 11/2009 | Schultz |
| 2009/0277650 A1 | 11/2009 | Casciaro |
| 2009/0301730 A1 | 12/2009 | Gweily |
| 2010/0025045 A1 | 2/2010 | Lake |
| 2010/0122804 A1 | 5/2010 | Yang |
| 2010/0181251 A1 | 7/2010 | Alspektor |
| 2010/0249723 A1 | 9/2010 | Fangrow, Jr. |
| 2010/0300568 A1 | 12/2010 | Faram |
| 2011/0017458 A1 | 1/2011 | East |
| 2011/0042091 A1 | 2/2011 | Dykstra |
| 2011/0042092 A1 | 2/2011 | Fripp et al. |
| 2011/0042323 A1 | 2/2011 | Sullivan |
| 2011/0079384 A1 | 4/2011 | Russell et al. |
| 2011/0139451 A1 | 6/2011 | McKeen |
| 2011/0139453 A1 | 6/2011 | Schultz |
| 2011/0186300 A1 | 8/2011 | Dykstra et al. |
| 2011/0198097 A1 | 8/2011 | Moen |
| 2011/0203671 A1 | 8/2011 | Doig |
| 2011/0214876 A1 | 9/2011 | Dykstra |
| 2011/0266001 A1 | 11/2011 | Dykstra |
| 2011/0297384 A1 | 12/2011 | Fripp |
| 2011/0297385 A1 | 12/2011 | Dykstra |
| 2012/0048563 A1 | 3/2012 | Holderman |
| 2012/0060624 A1 | 3/2012 | Dykstra |
| 2012/0061088 A1 | 3/2012 | Dykstra |
| 2012/0111577 A1 | 5/2012 | Dykstra |
| 2012/0125120 A1 | 5/2012 | Dykstra |
| 2012/0125626 A1 | 5/2012 | Constantine |
| 2012/0138304 A1 | 6/2012 | Dykstra |
| 2012/0145385 A1 | 6/2012 | Lopez |
| 2012/0152527 A1 | 6/2012 | Dykstra |
| 2012/0181037 A1 | 7/2012 | Holderman |
| 2012/0211243 A1 | 8/2012 | Dykstra |
| 2012/0234557 A1 | 9/2012 | Dykstra |
| 2012/0255351 A1 | 10/2012 | Dykstra |
| 2012/0255739 A1 | 10/2012 | Fripp |
| 2012/0255740 A1 | 10/2012 | Fripp |
| 2012/0305243 A1 | 12/2012 | Hallundbaek et al. |
| 2013/0020088 A1 | 1/2013 | Dyer et al. |
| 2013/0075107 A1 | 3/2013 | Dykstra |

FOREIGN PATENT DOCUMENTS

| | | |
|---|---|---|
| EP | 1857633 | 11/2007 |
| EP | 1857633 A2 | 11/2007 |
| WO | 0063530 A1 | 10/2000 |
| WO | 0214647 A2 | 2/2002 |
| WO | 03062597 A1 | 7/2003 |
| WO | 2004012040 A2 | 2/2004 |
| WO | 2004081335 A2 | 9/2004 |
| WO | 2006015277 A1 | 2/2006 |
| WO | 2008024645 A2 | 2/2008 |
| WO | PCT/US2008/075668 | 9/2008 |
| WO | 2009081088 A2 | 2/2009 |
| WO | 2009052076 A2 | 4/2009 |
| WO | 2009052103 A2 | 4/2009 |
| WO | 2009052149 | 4/2009 |
| WO | PCT/US2009/046363 | 6/2009 |
| WO | PCT/US2009/046404 | 6/2009 |
| WO | 2009088292 A1 | 7/2009 |
| WO | 2009088293 A1 | 7/2009 |
| WO | 2009088624 A2 | 7/2009 |
| WO | 2011002615 A2 | 1/2011 |

OTHER PUBLICATIONS

"Fluidics", Microsoft Encarta Online Encylopedia, copyright 1997-2009.

Kirshner et al., "Design Theory of Fluidic Components", 1975, Academic Press, New York.

Kirshner, "Fluid Amplifiers", 1966, McGraw-Hill, New York.

Tesar, "New Ways of Fluid Flow Control in Automobiles: Experience with Exhaust Gas Aftertreatment Control", Seoul 2000 FISITA World Automotive Congress, Jun. 12-15, 2000, F2000H192.

Tesar, "Sampling by Fluidics and Microfluidics", Acta Polytechnica vol. 42 No. 2/2002, Jun. 24, 2005.

Angrist, "Fluid Control Device", Scientific American Dec. 1964, pp. 80-88, Dec. 1, 1964.

Freyer, "An Oil Selective Inflow Control System", SPE 78272, Oct. 2002.

Flossert "Constant Flow Rate Product Brochure", Dec. 2002, 1 page.

Savkar, An Experimental Study of Switching in a Bistable Fluid Amplifier, University of Michigan, Dec. 1966.

"Apparatus and Method of Inducting Fluidic Oscillation in a Rotating Cleaning Nozzle," ip.com, dated Apr. 24, 2007, 3 pages.

Stephen L. Crow, Martin P. Coronado, Rustom K. Mody, "Means for Passive Inflow Control Upon Gas Breakthrough," SPE 102208, 2006 SPE Annual Technical Conference and Exhibition, San Antonio, Texas, U.S.A., Sep. 24-27, 2006, 6 pages.

(56) References Cited

OTHER PUBLICATIONS

Gebben, Vernon D., "Vortex Valve Performance Power Index," NASA TM X-52257, May 1967, pp. 1-14 plus 2 cover pages and Figures 1-8, National Aeronautics and Space Administration.

Haakh, Dr.-Ing. Frieder, "Vortex Chamber Diodes as Throttle Devices in Pipe Systems. Computation of Transient Flow," Journal of Hydraulic Research, 2003, vol. 41, No. 1, pp. 53-59.

Holmes, Allen B., et al., "A fluidic approach to the design of a mud pulser for bore-hole telemetry while drilling," DRCMS Code: 7-36AA-7100, HDL Project: A54735, Aug. 1979, pp. 1,2,5,6,9-27, and 29-37, Department of the Interior, U.S. Geological Survey, Washington, D.C.

Lee Precision Micro Hydraulics, Lee Restrictor Selector product brochure; Jan. 2011, 9 pages.

The Lee Company Technical Center, "Technical Hydraulic Handbook," 11th Edition, copyright 1971-2009, 7 pages Connecticut.

Weatherford product brochure entitled, "Application Answers—Combating Coning by Creating Even Flow Distribution in Horizontal Sand-Control Completions," 2005, 4 pages, Weatherford.

J.D Willingham, H.C. Tan, L.R. Norman, "Perforation Friction Pressure of Fracturing Fluid Slurries," SPE 25891, SPE Rocky Mountain Regional/Low Permeability Reservoirs Symposium, Denver, Co., U.S.A., Apr. 12-14, 1993, 14 pages.

Masahiro Takebayashi, Hiroshi Iwata, Akio Sakazume, Hiroaki Hata, "Discharge Characteristics of an Oil Feeder Pump Using Nozzle Type Fluidic Diodes for a Horizontal Compressor Depending on the Driving Speed," International Compressor Engineering Conference, Paper 597, 1988, 9 pages.

International Search Report and Written Opinion, PCT/US2012/032044, Mail Date Oct. 25, 2012, 9 pages.

Canadian Office Action, Application No. 2,737,998, Mail Date Jun. 21, 2013, 3 pages.

European Search Report, Application No. EP 13 18 2098, Mail Date Nov. 13, 2013, 8 pages.

\* cited by examiner

AUTONOMOUS FLUID CONTROL DEVICE HAVING A MOVABLE VALVE PLATE FOR DOWNHOLE FLUID SELECTION

CROSS-REFERENCE TO RELATED APPLICATIONS

None.

FIELD OF INVENTION

The invention relates generally to methods and apparatus for selective control of fluid flow from a formation in a hydrocarbon bearing subterranean formation into a production string in a wellbore. More particularly, the invention relates to methods and apparatus for controlling the flow of fluid based on some characteristic of the fluid flow, such as viscosity or density, by utilizing a vortex chamber with a plurality of outlets, at least one of which can be closed by a valve element actuated by the centrifugal force of the fluid in the vortex.

BACKGROUND OF INVENTION

During the completion of a well that traverses a hydrocarbon bearing subterranean formation, production tubing and various equipment are installed in the well to enable safe and efficient production of the fluids. For example, to prevent the production of particulate material from an unconsolidated or loosely consolidated subterranean formation, certain completions include one or more sand control screens positioned proximate the desired production intervals. In other completions, to control the flow rate of production fluids into the production tubing, it is common practice to install one or more inflow control devices with the completion string.

Production from any given production tubing section can often have multiple fluid components, such as natural gas, oil and water, with the production fluid changing in proportional composition over time. Thereby, as the proportion of fluid components changes, the fluid flow characteristics will likewise change. For example, when the production fluid has a proportionately higher amount of natural gas, the viscosity of the fluid will be lower and density of the fluid will be lower than when the fluid has a proportionately higher amount of oil. It is often desirable to reduce or prevent the production of one constituent in favor of another. For example, in an oil-producing well, it may be desired to reduce or eliminate natural gas production and to maximize oil production. While various downhole tools have been utilized for controlling the flow of fluids based on their desirability, a need has arisen for a flow control system for controlling the inflow of fluids that is reliable in a variety of flow conditions. Further, a need has arisen for a flow control system that operates autonomously, that is, in response to changing conditions downhole and without requiring signals from the surface by the operator. Further, a need has, arisen for a flow control system without moving mechanical parts which are subject to breakdown in adverse well conditions including from the erosive or clogging effects of sand in the fluid. Similar issues arise with regard to injection situations, with flow of fluids going into instead of out of the formation.

SUMMARY OF THE INVENTION

An apparatus and method are described for autonomously controlling flow of fluid in a subterranean well, where fluid flow is controlled based on a fluid characteristic which changes over time. In a preferred embodiment, fluid flows into a vortex assembly where a centrifugal force is imparted to the fluid. A less viscous or dense fluid, such as water or natural gas, will have a greater velocity and centrifugal force than a more viscous or dense fluid, such as oil. The fluid exits the vortex chamber by both a vortex outlet at the bottom and a peripheral outlet positioned along the vortex wall. An autonomous, pivoting valve element, moves between an open position in which fluid flows freely through the peripheral outlet and a closed position in which fluid flow through the peripheral outlet is reduced or prevented. The valve element is moved by the centrifugal force of the fluid, such that a less viscous fluid, having a higher centrifugal force, moves the valve element to the closed position, thereby reducing the total fluid flow through the vortex assembly. In a preferred embodiment, the pivoting valve element is a cantilever. Preferably, the pivoting valve element is spring-biased toward the open position such that it will re-open when the centrifugal force lessens, such as when the fluid viscosity decreases.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF PREFERRED EMBODIMENTS

Figure 1:
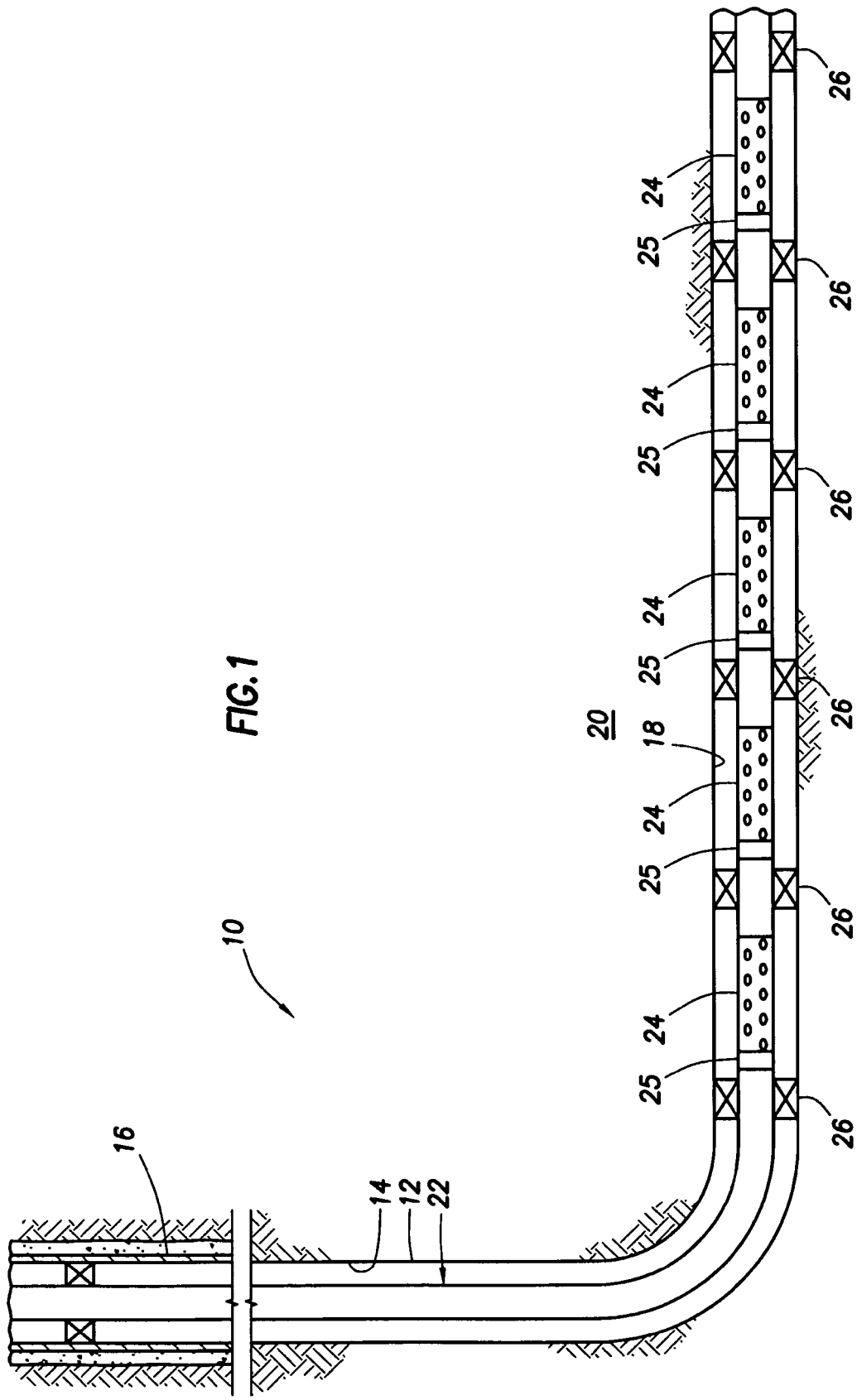
FIG. 1 is a schematic illustration of a well system including a plurality of autonomous fluid flow control systems according to an embodiment of the invention.

While the making and using of various embodiments of the present invention are discussed in detail below, a practitioner of the art will appreciate that the present invention provides applicable inventive concepts which can be embodied in a variety of specific contexts. The specific embodiments discussed herein are illustrative of specific ways to make and use the invention and do not limit the scope of the present invention.

Descriptions of fluid flow control using autonomous flow control devices and their application can be found in the following U.S. Patents and Patent Applications, each of which are hereby incorporated herein in their entirety for all purposes: U.S. Pat. No. 7,404,416, entitled "Apparatus and Method For Creating Pulsating Fluid Flow, And Method of Manufacture For the Apparatus," to Schultz, filed Mar. 25, 2004; U.S. Pat. No. 6,976,507, entitled "Apparatus for Creating Pulsating Fluid Flow," to Webb, filed Feb. 8, 2005; U.S. patent application Ser. No. 12/635,612, entitled "Fluid Flow Control Device," to Schultz, filed Dec. 10, 2009; U.S. patent application Ser. No. 12/770,568, entitled "Method and Apparatus for Controlling Fluid Flow Using Movable Flow Diverter Assembly," to Dykstra, filed Apr. 29, 2010; U.S. patent application Ser. No. 12/700,685, entitled "Method and Apparatus for Autonomous Downhole Fluid Selection With Pathway Dependent Resistance System," to Dykstra, filed Feb. 4, 2010; U.S. patent application Ser. No. 12/750,476, entitled "Tubular Embedded Nozzle Assembly for Controlling the Flow Rate of Fluids Downhole," to Syed, filed Mar. 30, 2010; U.S. patent application Ser. No. 12/791,993, entitled "Flow Path Control Based on Fluid Characteristics to Thereby Variably Resist Flow in a Subterranean Well," to Dykstra, filed Jun. 2, 2010; U.S. patent application Ser. No. 12/792,095, entitled "Alternating Flow Resistance Increases and Decreases for Propagating Pressure Pulses in a Subterranean Well," to Fripp, filed Jun. 2, 2010; U.S. patent application Ser. No. 12/792,117, entitled "Variable Flow Resistance System for Use in a Subterranean Well," to Fripp, filed Jun. 2, 2010; U.S. patent application Ser. No. 12/792,146, entitled "Variable Flow Resistance System With Circulation Inducing Structure Therein to Variably Resist Flow in a Subterranean Well," to Dykstra, filed Jun. 2, 2010; U.S. patent application Ser. No. 12/879,846, entitled "Series Configured Variable Flow Restrictors For Use In A Subterranean Well," to Dykstra, filed Sep. 20, 2010; U.S. patent application Ser. No. 12/869,836, entitled "Variable Flow Restrictor For Use In A Subterranean Well," to Holderman, filed Aug. 27, 2010; U.S. patent application Ser. No. 12/958,625, entitled "A Device For Directing The Flow Of A Fluid Using A Pressure Switch," to Dykstra, filed Dec. 2, 2010; U.S. patent application Ser. No. 12/974,212, entitled "An Exit Assembly With a Fluid Director for Inducing and Impeding Rotational Flow of a Fluid," to Dykstra, filed Dec. 21, 2010; U.S. patent application Ser. No. 12/983,144, entitled "Cross-Flow Fluidic Oscillators for use with a Subterranean Well ," to Schultz, filed Dec. 31, 2010; U.S. patent application Ser. No. 12/966,772, entitled "Downhole Fluid Flow Control System and Method Having Direction Dependent Flow Resistance," to Jean-Marc Lopez, filed Dec. 13, 2010; U.S. patent application Ser. No. 12/983,153, entitled "Fluidic Oscillators For Use With A Subterranean Well (includes vortex)," to Schultz, filed Dec. 31, 2010; U.S. patent application Ser. No. 13/084,025, entitled "Active Control for the Autonomous Valve," to Fripp, filed Apr. 11, 2011; U.S. patent application Ser. No. 61/473,700, entitled "Moving Fluid Selectors for the Autonomous Valve," to Fripp, filed Apr. 8, 2011; U.S. patent application Ser. No. 61/473,699, entitled "Sticky Switch for the Autonomous Valve," to Fripp, filed Apr. 8, 2011; and U.S. patent application Ser. No. 13/100,006, entitled "Centrifugal Fluid Separator," to Fripp, filed May 3, 2011.

FIG. 1 is a schematic illustration of a well system, indicated generally 10, including a plurality of autonomous flow control systems embodying principles of the present invention. A wellbore 12 extends through various earth strata. Wellbore 12 has a substantially vertical section 14, the upper portion of which has installed therein a casing string 16. Wellbore 12 also has a substantially deviated section 18, shown as horizontal, which extends through a hydrocarbon-bearing subterranean formation 20. As illustrated, substantially horizontal section 18 of wellbore 12 is open hole. While shown here in an open hole, horizontal section of a wellbore, the invention will work in any orientation, and in open or cased hole. The invention will also work equally well with injection systems, as will be discussed supra.

Positioned within wellbore 12 and extending from the surface is a tubing string 22. Tubing string 22 provides a conduit for fluids to travel from formation 20 upstream to the surface. Positioned within tubing string 22 in the various production intervals adjacent to formation 20 are a plurality of autonomous flow control systems 25 and a plurality of production tubing sections 24. At either end of each production tubing section 24 is a packer 26 that provides a fluid seal between tubing string 22 and the wall of wellbore 12. The space in-between each pair of adjacent packers 26 defines a production interval.

In the illustrated embodiment, each of the production tubing sections 24 includes sand control capability. Sand control screen elements or filter media associated with production tubing sections 24 are designed to allow fluids to flow therethrough but prevent particulate matter of sufficient size from flowing therethrough. While the invention does not need to have a sand control screen associated with it, if one is used, then the exact design of the screen element associated with fluid flow control systems is not critical to the present invention. There are many designs for sand control screens that are well known in the industry, and will not be discussed here in detail. Also, a protective outer shroud having a plurality of perforations therethrough may be positioned around the exterior of any such filter medium.

Through use of the flow control systems 25 of the present invention in one or more production intervals, some control over the volume and composition of the produced fluids is enabled. For example, in an oil production operation if an undesired fluid component, such as water, steam, carbon dioxide, or natural gas, is entering one of the production intervals, the flow control system in that interval will autonomously restrict or resist production of fluid from that interval.

The term "natural gas" or "gas" as used herein means a mixture of hydrocarbons (and varying quantities of non-hydrocarbons) that exist in a gaseous phase at room temperature and pressure. The term does not indicate that the natural gas is in a gaseous phase at the downhole location of the inventive systems. Indeed, it is to be understood that the flow control system is for use in locations where the pressure and temperature are such that natural gas will be in a mostly liquefied state, though other components may be present and some components may be in a gaseous state. The inventive concept will work with liquids or gases or when both are present.

The fluid flowing into the production tubing section 24 typically comprises more than one fluid component. Typical components are natural gas, oil, water, steam or carbon dioxide. Steam and carbon dioxide are commonly used as injection fluids to drive the hydrocarbon towards the production tubular, whereas natural gas, oil and water are typically found in situ in the formation. The proportion of these components in the fluid flowing into each production tubing section 24 will vary over time and based on conditions within the formation and wellbore. Likewise, the composition of the fluid flowing into the various production tubing sections throughout the length of the entire production string can vary significantly from section to section. The flow control system is designed to reduce or restrict production from any particular interval when it has a higher proportion of an undesired component.

Accordingly, when a production interval corresponding to a particular one of the flow control systems produces a greater proportion of an undesired fluid component, the flow control system in that interval will restrict or resist production flow from that interval. Thus, the other production intervals which are producing a greater proportion of desired fluid component, in this case oil, will contribute more to the production stream entering tubing string 22. In particular, the flow rate from formation 20 to tubing string 22 will be less where the fluid must flow through a flow control system (rather than simply flowing into the tubing string). Stated another way, the flow control system creates a flow restriction on the fluid.

Though FIG. 1 depicts one flow control system in each production interval, it should be understood that any number of systems of the present invention can be deployed within a production interval without departing from the principles of the present invention. Likewise, the inventive flow control systems do not have to be associated with every production interval. They may only be present in some of the production intervals in the wellbore or may be in the tubing passageway to address multiple production intervals.

Figure 2:
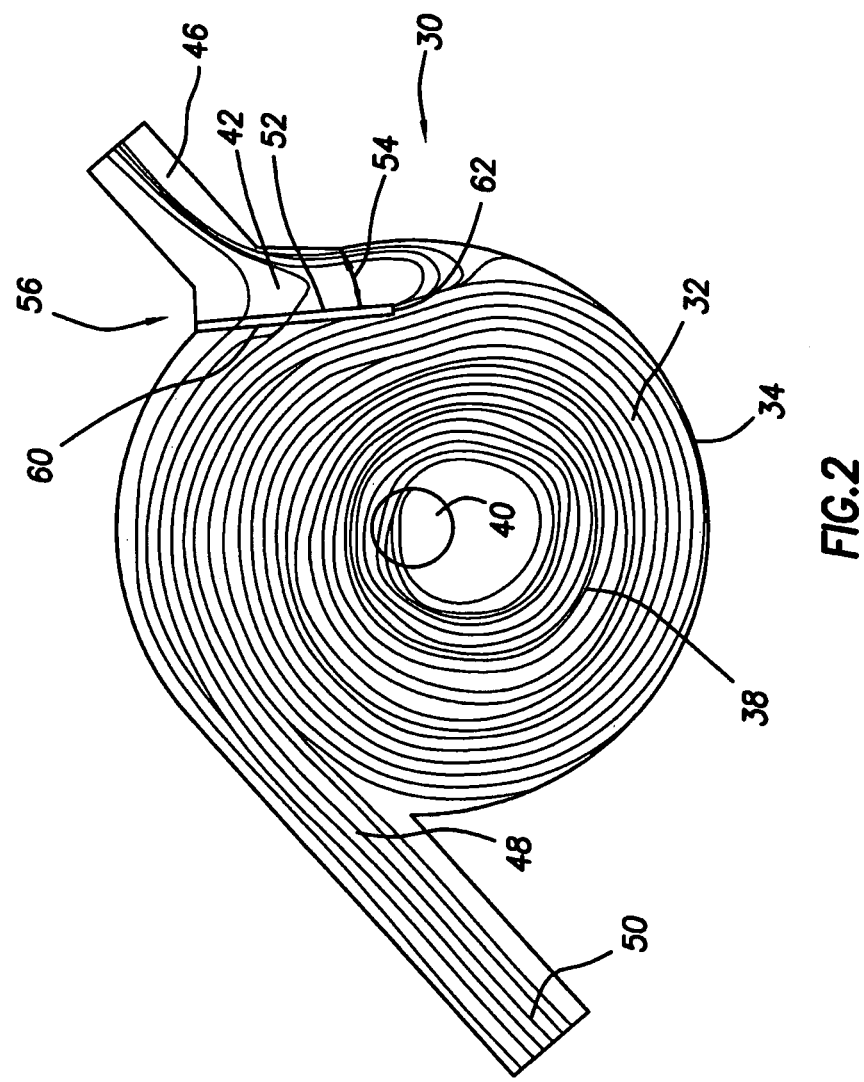
FIG. 2 is a top view, fluid flow diagram of an autonomous fluid flow control device utilizing a vortex assembly embodying principles of the present invention.
Figure 3:
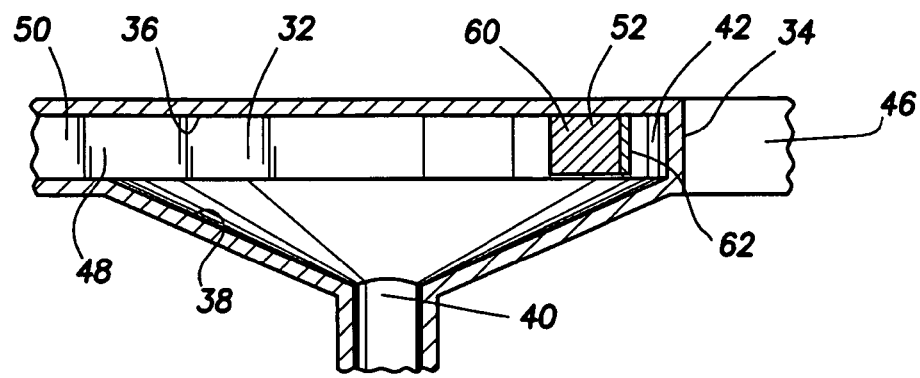
FIG. 3 is a side view in cross-section of a fluid flow control device utilizing a vortex assembly embodying principles of the present invention.

FIG. 2 is a top plan view of a fluid control device according to an embodiment of the invention showing fluid flow paths there through. FIG. 3 is an elevational view of the fluid control device. The fluid control device is vortex-based, and has a vortex assembly 30 with a vortex chamber 32 having a peripheral wall 34, a top surface 36 (not shown in FIG. 2), a bottom surface 38 which slopes to a vortex outlet 40, and a peripheral outlet 42. The device can be used as part of a fluid control system 25, in conjunction with additional autonomous fluid control devices, such as those described in the patent applications which are incorporated herein, in series or parallel arrangements with additional flow control systems, inflow control devices, and either up or down stream from such devices.

The vortex outlet 40 is preferably centrally positioned in the bottom surface 38 of the vortex chamber, as shown, but may be positioned in the bottom surface 38 based upon the fluid flow patterns expected to occur in the vortex assembly and desired flow patterns through the vortex assembly outlets. The vortex outlet 40 is in fluid communication with a vortex outlet passageway 44 which directs fluid flow downstream from the vortex assembly 30. For example, the vortex outlet passageway 44 can direct fluid flow to the surface, such as through tubing string 22, back into the wellbore 12, to other tubing sections 24, uphole or downhole depending on the application, etc.

The peripheral outlet 42 is positioned at the periphery of the vortex chamber, preferably opening through the peripheral wall 34. The peripheral outlet 42 is in fluid communication with peripheral outlet passageway 46 which directs fluid flow downstream from the vortex assembly 30. For example, the peripheral outlet passageway 46 can direct fluid flow to the surface, such as through tubing string 22, back into the wellbore 12, to other tubing sections 24, uphole or downhole depending on the application, etc. The outlet passageways 44 and 46 can be connected to the same or different passageways downstream from the assembly. For example, in one embodiment, the fluid flow is directed from both outlets to the surface through production tubing. The benefit derived is from the ratio of fluid flow through the outlets and not through directing flow to different end points. In other embodiments, the outlet passages can direct the fluid to different end points.

The vortex assembly 30 has an inlet 48, preferably positioned in the peripheral wall 34 to allow fluid to flow into the vortex chamber 32. The inlet 48 is in fluid communication with inlet passageway 50 which directs fluid flow into the vortex assembly from upstream. For example, the inlet passageway 50 can provide fluid flow into the vortex assembly 30 from production fluid from the wellbore 12, from production fluid directed through passageways in production sections, production tubing, via screens, ICDs, etc.

Figure 4:
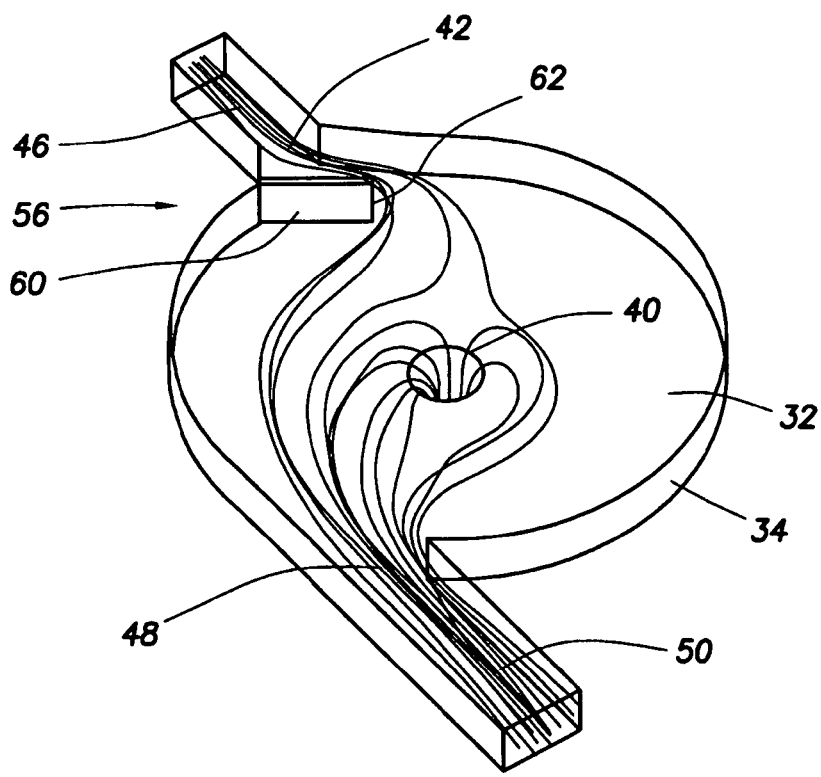
FIG. 4 is a top view, fluid flow diagram of an autonomous fluid flow control device having a highly viscous fluid flowing there through, with the valve element in the open position, according to an embodiment of the invention.
Figure 5:
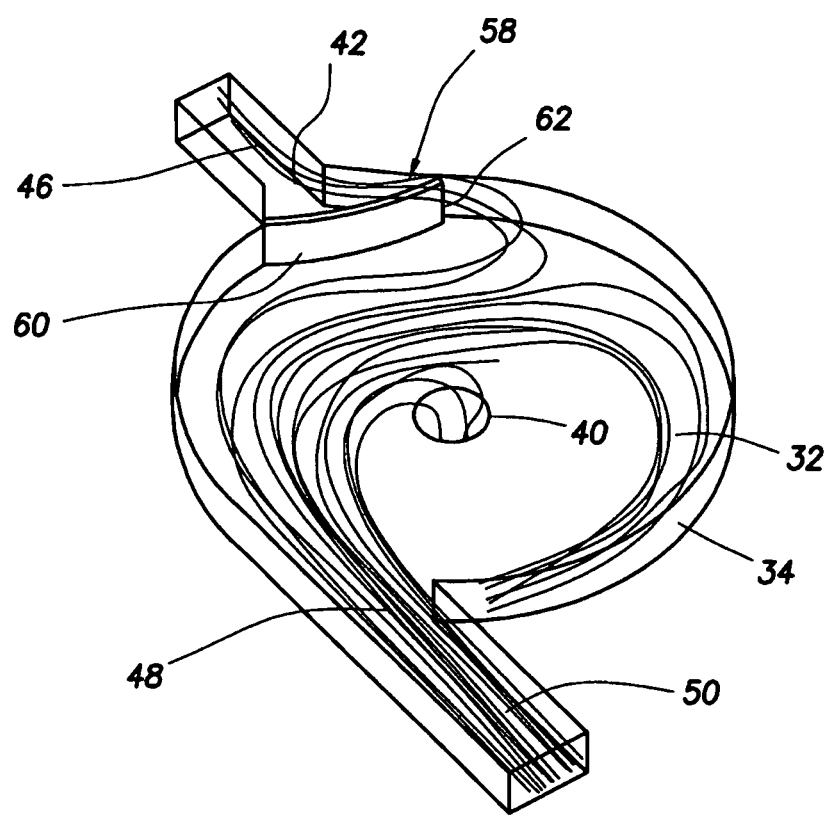
FIG. 5 is a top view, fluid flow diagram of an autonomous fluid flow control device having a low viscosity fluid flowing there through, with the valve element in the closed position, according to an embodiment of the invention It should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure. Where this is not the case and a term is being used to indicate a required orientation, the Specification will state or make such clear. Upstream and downstream are used to indicate location or direction in relation to the surface, where upstream indicates relative position or movement towards the surface along the wellbore and downstream indicates relative position or movement further away from the surface along the wellbore.

The vortex assembly 30 further includes an autonomous pivoting element 52. As used herein, the term "pivoting" means moving, or designed to move, in a curved or circular path on or as if on an axis. The autonomous pivoting element 52 is, in a preferred embodiment, attached to the vortex peripheral wall 34. Alternately, the pivoting element 52 can be attached to the vortex top surface 36, bottom surface 38, a combination of surfaces or intervening elements, such as a pivot pin or rod, hinge, and other types of pivoted connection as known in the art. The autonomous pivoting element is movable along a path 54, in response to the force exerted on it by fluid flowing in the vortex chamber, between an open position 56, as seen in FIGS. 2 and 4, and a closed position 58, as seen in FIG. 5.

The valve element 52 is preferably biased toward the open position 56. The biasing effect can be through means known to those of skill in the art. In a preferred embodiment, the pivoting element 52 is biased toward the open position by the rigidity and elasticity of the element. That is, the element 52 acts as a cantilever spring which bends in response to fluid force exerted on face 60. (The bending of a cantilevered version of the element is encompassed by the use of the term "pivot" as used herein.) The behavior of the cantilevered element 52 can be selected based on the dimension of the element, material selection, and the related material properties, such as the modulus of elasticity, density, shear modulus, etc. In alternate embodiments, for example, the element 52 can be biased using a compression, tension, torsion, flat, coil, leaf and other spring devices as known in the art.

Further, the pivoting element 52 can be mounted to the vortex assembly, such as by a pin or rod, about which the element 52 rotates (not shown). One benefit of the preferred cantilever design is that flow is easily prevented around the attached end of the element.

The autonomous pivoting element 52, as stated above, moves along a curved path 54 between an open position 56 and closed position 58. The element moves, in use, to a closed position and effectively restricts or reduces fluid flow through peripheral outlet 42 in a preferred embodiment. The element can be designed as desired to completely prevent flow through the peripheral outlet when in the closed position or to allow a reduced flow. In a preferred embodiment, the element 52 includes a contact surface 62 which, when the element is in the closed position, contacts the peripheral wall 34. The element 52 can also contact and/or seal against the top and bottom surfaces of the assembly. As seen in FIGS. 2 and 5, in some embodiments a relatively small amount of fluid flow may still flow over, under or around the valve element, even when in the closed position. If some amount of flow is desired even where the element is in the closed position, the element can be designed to reduce, but not prevent, fluid flow through the peripheral outlet. For example, a cantilevered element can be selected of a length or shape such that it will not entirely block the peripheral outlet or can be of a stiffness such that it will not bend or move to completely block flow. Alternately, the pivoting element can be prevented from movement to a position that completely blocks flow, such as by a peg or stop, by reaching the limit of movement of the biasing spring, or other methods, at any desired position.

In use, fluid "F" flows into the inlet passageway 50, through inlet 48 and into the vortex chamber 32. The vortex chamber 32 induces a spiral flow pattern in the fluid, as seen, for example in FIG. 4. The spiraling fluid gathers centrifugal force as it gains velocity during spiraling. When the autonomous valve element 52 is in the open position, the fluid exits the vortex chamber 32 by both the vortex outlet 40 and the peripheral outlet 42. The vortex assembly can be designed to split these outlet flows as desired. For example, when the autonomous valve element 52 is in its open position 56, the fluid flow can be split 60:40, 50:50, 40:60, or other desired ratio, between the vortex outlet 40 and the peripheral outlet 42. In the closed position, the flow ratio increases, much as to 100:0, 90:10, 80:20, or other desired or potential ratio.

A portion of the fluid flow impinges upon the autonomous valve element 52. In a preferred embodiment, the fluid flow impinges upon a face 60 of the element 52. As the centrifugal force of the fluid impinging on the element 52 overcomes the spring force biasing the element 52 toward the open position, the element 52 is moved along path 54 toward the closed position 58. As the element 52 moves toward the closed position, fluid flow through the peripheral outlet 42 is reduced and a greater proportion of fluid flow is directed through the vortex outlet 40. The greater the force bearing on the element, the further the element moves toward the closed position until it is completely closed. In the closed position 58, as explained above, the fluid flow through the peripheral outlet 42 is reduced or prevented. With the greater proportion of fluid flow through the vortex outlet 40, the overall fluid flow through the assembly 30 is reduced. The overall fluid reduction through the assembly can be selected through design of the constituent parts. For example, the overall fluid flow through the assembly can drop by 70 percent or more when the element 52 is in the closed position. When the centrifugal force of the fluid impinging on the element 52 decreases to less than the biasing force acting on the element 52, the element will move toward the open position 56.

As the centrifugal force varies over time, the element 52 will move between positions in response to the centrifugal and biasing forces. In a producing well, the proportion of fluid components changes over time with a resulting change in fluid characteristics such as viscosity, density, etc. For example, a formation fluid may have a higher proportion of oil and smaller proportions of water and gas at a first time. At a later time, the formation fluid can have a greater proportion of water and gas and lower proportion of oil. The vortex assembly 30 takes advantage of the change in fluid characteristics to alter the fluid flow pattern through the assembly. As the fluid characteristic varies, such as to a relatively less viscous or less dense state, the valve element opens due to the reduction in centrifugal force on the element and/or the force of the biasing member. The valve element will open and close numerous times as the characteristic of the fluid changes over time.

FIG. 3 shows a vortex assembly according to an embodiment of the invention with a relatively high viscosity fluid flowing there through. When the formation fluid is of relatively high viscosity, such as when the formation fluid is of a higher proportion of oil, the fluid flow is at a relatively lower viscosity and the flow pattern will tend towards less tangential, spiraling flow and more radial flow, as seen in FIG. 3. The lower viscosity fluid, with lower relative velocity, will result in relatively lower centrifugal force. The lower centrifugal force will produce relatively little force on the element face 60. For example, oil of 1000 cP, at a gallon per minute, and under 14 bar of pressure, was modeled on an exemplary assembly to produce a pressure of 400 kPa on the element face 60. The relatively lower pressure and force does not move the element 52, which stays in or near the open position 56. Consequently, the relatively more viscous fluid flows through the vortex assembly through both the vortex outlet 40 and the peripheral outlet 46.

FIG. 4 shows the vortex assembly according to an embodiment of the invention with a relatively low viscosity fluid flowing there through. When the formation fluid changes to be of relatively low viscosity, such as with a higher proportion of gas or water, the fluid tends to flow at a higher velocity, in a more tangential path, creating a spiraling flow around the vortex chamber. This flow pattern is seen in FIG. 4. For example, water, at a gallon per minute, and under 6 bar of pressure, was modeled on an exemplary assembly to produce a pressure of 400 kPa on the element face 60. Similarly, a gas of 0.02 cP, at 2 gallons per minute and 3 bar produced a modeled result of 300 kPa pressure on the face 60. The relatively higher pressure and centrifugal force tends to move the element 52 towards the closed position 58, thereby reducing or preventing fluid flow through peripheral outlet 42. Consequently, the relatively lower viscous fluid flows through the vortex assembly through primarily or only the vortex outlet 40. This effectively reduced the total fluid flow through the assembly (where total fluid flow is the combined flow through the peripheral and vortex outlets).

As the characteristics of the fluid change during the life of the tool having the vortex assembly, the vortex assembly will allow relatively greater flow rates for lower viscosity fluids and relatively lower flow rates for higher viscosity fluids. When the viscosity changes from relatively high (such as oil) to relatively low (such as water or oil), the autonomous valve element will move towards the closed position and reduce flow through the peripheral outlet. As the viscosity changes to a relatively higher viscosity, such as where the proportion of water and/or gas drops and the proportion of oil rises, the autonomous valve element pivots back toward the open position and overall flow rate through the assembly increases. The element will continue to change positions as the fluid viscosity changes over time. (This discussion is in terms of viscosity, but it is understood that similar concepts apply where a different fluid characteristic is observed, such as density, etc.).

The vortex assembly 30 described herein is exemplary in nature. Other variants can be utilized, such as multiple inlets, inlets in different locations along the periphery wall or elsewhere, a different number and positioning of outlets, varying shape of the vortex chamber and its walls, different shape and size of the autonomous valve element, etc. Further, additional features, such as vanes, grooves, and other directional elements can be added to the vortex chamber. The exemplary embodiment described herein can be modified in its particulars, such as the angle between the inlet passageway and the vortex wall, the positioning of the peripheral outlet, the angle of the peripheral outlet and peripheral wall, the proportional dimensions of the passageways, chamber and other elements, etc.

The description above of the assembly in use is provided in the exemplary embodiment wherein production fluid from the formation is directed through the assembly 30. The production fluid can flow through screens, passageways, tubular sections, annular passageways, etc., before and after flowing through the assembly 30. The assembly 30 can also be used for injection and other completion activities, as explained in incorporated references and as understood by those of skill in the art.

The invention can also be used with other flow control systems, such as inflow control devices, sliding sleeves, and other flow control devices that are already well known in the industry. The inventive system can be either parallel with or in series with these other flow control systems.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

It is claimed:

1. An apparatus for autonomously controlling flow of fluid in a subterranean well, wherein a fluid characteristic of the fluid flow changes over time, comprising:
   a vortex assembly having a top surface, a bottom surface and a peripheral wall, defining a vortex chamber;
   an inlet providing fluid communication into the vortex chamber;
   a vortex outlet positioned at the bottom surface of the vortex chamber;
   a peripheral outlet positioned along the peripheral wall of the vortex chamber; and
   an autonomous, pivoting valve element, attached to the vortex assembly for moving between an open position in which fluid flow through the peripheral outlet is allowed, and a closed position in which fluid flow through the peripheral outlet is reduced.

2. An apparatus as in claim 1, wherein the pivoting valve element is a cantilever.

3. An apparatus as in claim 1 wherein the pivoting valve element is biased toward the open position.

4. An apparatus as in claim 3, further comprising a spring, and wherein the pivoting valve element is biased toward the open position by the spring.

5. An apparatus as in claim 1, wherein the pivoting valve element prevents fluid flow through the peripheral outlet when in the closed position.

6. An apparatus as in claim 1, wherein the pivoting valve element is movable in response to a centrifugal force of the fluid flowing in the vortex chamber.

7. An apparatus as in claim 6, wherein the centrifugal force of the fluid increases as a viscosity of the fluid decreases.

8. An apparatus as in claim 1, wherein the assembly has a total outlet flow rate, and wherein the total outlet flow rate is decreased when the pivoting valve element is moved toward the closed position.

9. An apparatus as in claim 2, wherein the cantilevered valve element pivots by bending.

10. An apparatus as in claim 1, wherein the characteristic of the fluid which changes over time is viscosity.

11. An apparatus as in claim 1, further comprising a downhole tool, the vortex assembly positioned in the downhole tool.

12. A method for controlling fluid flow in a subterranean well having a wellbore extending there through, the method comprising the steps of:
   flowing fluid through a downhole tool;
   flowing fluid into a vortex chamber;
   flowing fluid through at least two outlets in the vortex chamber, a first outlet positioned along a periphery of vortex chamber and the second outlet positioned proximate a bottom of the vortex chamber;
   moving an autonomous valve element positioned in the vortex chamber in response to a change in a fluid characteristic of the flowing fluid in the vortex chamber;
   reducing fluid flow through the first outlet by the moving the autonomous valve element.

13. A method as in claim 12, further comprising the step of: preventing fluid flow through the first outlet by the moving of the autonomous valve element.

14. A method as in claim 12, wherein the fluid characteristic is viscosity.

15. A method as in claim 12, wherein, in response to a change in fluid characteristic, the fluid flow in the vortex chamber increases in velocity.

16. A method as in claim 12, wherein, in response to a change in fluid characteristic, a centrifugal force exerted by the fluid flow in the vortex chamber increases.

17. A method as in claim 12, wherein, in response to a change in fluid characteristic, a force exerted by the fluid flow on a face of the autonomous valve increases.

18. A method as in claim 12, wherein the step of moving the autonomous valve element includes moving the autonomous valve element towards a closed position;
   and further comprising the step of: moving the autonomous valve element toward an open position in response to another change in the fluid characteristic.

19. A method as in claim 12, wherein the step of moving the autonomous valve element further comprises: moving the autonomous valve element alternately toward a closed position and toward an open position in response to changes in fluid characteristic over time.

20. A method as in claim 12, wherein the step of moving the autonomous valve element further includes pivoting the autonomous valve element.

* * * * *